(12) United States Patent
Lee et al.

(10) Patent No.: US 10,704,904 B2
(45) Date of Patent: Jul. 7, 2020

(54) DISTANCE DETECTION DEVICE

(71) Applicant: PixArt Imaging Inc., Hsin-Chu (TW)

(72) Inventors: Hun Kwang Lee, Penang (MY); Sai Mun Lee, Penang (MY); Lye Pin Chu, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 105 days.

(21) Appl. No.: 15/925,773

(22) Filed: Mar. 20, 2018

(65) Prior Publication Data

US 2019/0293419 A1 Sep. 26, 2019

(51) Int. Cl.
*G06T 7/00* (2017.01)
*G01C 3/08* (2006.01)
*G06T 7/73* (2017.01)

(52) U.S. Cl.
CPC . *G01C 3/08* (2013.01); *G06T 7/74* (2017.01)

(58) Field of Classification Search
CPC ................................ G01C 3/08; G06T 7/74
See application file for complete search history.

(56) References Cited

U.S. PATENT DOCUMENTS

| 6,433,860 | B1 * | 8/2002 | Ohishi | G01C 3/08 |
| | | | | 356/4.01 |
| 2014/0327902 | A1 * | 11/2014 | Giger | G01S 17/08 |
| | | | | 356/5.01 |
| 2017/0160130 | A1 * | 6/2017 | Morino | G01B 11/245 |
| 2017/0365065 | A1 * | 12/2017 | Stigwall | G06T 7/55 |

* cited by examiner

*Primary Examiner* — Ping Y Hsieh
(74) *Attorney, Agent, or Firm* — Winston Hsu

(57) ABSTRACT

A distance detection device includes a light source, a light guiding component, an image sensor and a processor. The light guiding component is disposed adjacent to the light source and includes a discontinuous surface. The light guiding component is adapted to project a beam emitted from the light source onto an object to form an illuminating pattern spotted by the discontinuous surface. The image sensor is adapted to capture an image about the object. The processor is electrically connected with the image sensor and utilized to analyze position variation of a spot formed by the discontinuous surface within the image for determining a distance of the object.

18 Claims, 15 Drawing Sheets

DISTANCE DETECTION DEVICE

BACKGROUND OF THE INVENTION

1. Field of the Invention

The present invention relates to a distance detection device, and more particularly, to a distance detection device with navigation detection function.

2. Description of the Prior Art

An optical navigation device captures and analyzes an image about a working surface where the optical navigation device is moved on, so as to acquire navigation information via displacement detection. When the conventional optical navigation device is lifted and moved above the working surface, the conventional optical navigation device generally utilizes a distance detector to compute a lifting height from the working surface, and the distance detector can be a laser detector, an infrared detector, a sonar detector and so on. A processor of the conventional optical navigation device has to compute data from the optical navigation detector and the height distance detector, and therefore the conventional optical navigation device provides low operation efficiency and expensive hardware cost.

SUMMARY OF THE INVENTION

The present invention provides a distance detection device with navigation detection function for solving above drawbacks.

According to the claimed invention, a distance detection device includes a light source, a light guiding component, an image sensor and a processor. The light guiding component is disposed adjacent to the light source and includes a discontinuous surface. The light guiding component is adapted to project a beam emitted from the light source onto an object to form an illuminating pattern spotted by the discontinuous surface. The image sensor is adapted to capture an image about the object. The processor is electrically connected with the image sensor and utilized to analyze position variation of a spot formed by the discontinuous surface within the image for determining a distance of the object.

According to the claimed invention, the discontinuous surface is a truncated portion formed on a corner or an edge of an illuminating surface of the light guiding component, and the image sensor has a capturing region and the spot is moved from an outside of the capturing region into the capturing region while a distance between the distance detection device and the object is varied over a predetermined threshold. Further, the discontinuous surface is an uneven portion formed on an illuminating surface of the light guiding component. The spot is moved within a capturing region of the image sensor while a distance between the distance detection device and the object is varied, and the uneven portion is a sunken structure or a protruding structure disposed on the illuminating surface.

According to the claimed invention, the discontinuous surface further can be a mask pasted on an illuminating surface of the light guiding component, or can be a non-planar structure formed on the light guiding component.

According to the claimed invention, a distance detection device includes a light source, a light guiding component, an image sensor and a processor. The light guiding component is disposed adjacent to the light source and includes an illuminating surface. A beam emitted from the light source passes through the illuminating surface and is projected onto an object to form an illuminating pattern. The image sensor has a capturing region and is adapted to capture an image about the object. Dimensions of the illuminating pattern are smaller than dimensions of the capturing region. The processor is electrically connected with the image sensor and utilized to analyze position variation of the illuminating pattern within the image for determining a distance of the object.

According to the claimed invention, the illuminating pattern is shifted inside the capturing region while a distance between the distance detection device and the object is varied. Further, the illuminating pattern is shifted from an outside of the capturing region into the capturing region while a distance between the distance detection device and the object is varied.

According to the claimed invention, a distance detection device includes a light source, a light guiding component, an image sensor and a processor. The light guiding component is disposed adjacent to the light source and includes an illuminating surface, and a beam emitted from the light source passes through the illuminating surface and is projected onto an object to form an illuminating pattern. The image sensor has a capturing region and is adapted to capture an image about the object. An overlapping scale of the illuminating pattern to the capturing region is varied according to a distance of the object. The processor is electrically connected with the image sensor and utilized to analyze the overlapping scale for determining the distance of the object. The distance of the object is switched between a first threshold and a second threshold to adjust the overlapping scale.

According to the claimed invention, a first optical axis of the light guiding component is slanted to a second optical axis of the image sensor, and a fixed angle formed between the first optical axis and the second optical axis is adjusted to set predefined variation of the overlapping scale. Further, an interval between the light guiding component and the image sensor is adjusted to set predefined variation of the overlapping scale.

According to the claimed invention, as the first threshold is shorter than the second threshold, the illuminating pattern and the capturing region are not overlapped while the distance is set in the first threshold, and the illuminating pattern and the capturing region are overlapped while the distance is switched from the first threshold to the second threshold. The illuminating pattern within the capturing region is enlarged while the distance is varied over a predetermined threshold. As the first threshold is longer than the second threshold, the illuminating pattern is fully overlapped with the capturing region while the distance is set in the first threshold, and the illuminating pattern is partly overlapped with the capturing region while the distance is switched from the first threshold to the second threshold. The illuminating pattern within the capturing region is reduced while the distance is varied over a predetermined threshold.

The distance detection device of the present invention can detect the image about the object to acquire the navigation information. For the sake of the distance detection function, the spot formed by the discontinuous surface of the light guiding component or the overlapped scale of the illuminating pattern to the capturing region can be applied to establish linear relation between the spot motion and steep motion of the distance detection device. In some embodiments, the planar or non-planar truncated portion can be cut on the corner or the edge of the light guiding component; in another possible embodiments, the sunken structure, the protruding structure or the mask can be disposed close to the edge of the light guiding component; in another possible embodiments, dimensions of the illuminating surface can be reduced or the inclination and interval between the light guiding component and the image sensor can be adjusted for obtaining variation of the overlapped scale. The distance detection device can be applied for a navigation apparatus, such as an optical mouse. The navigation apparatus can stop displacement detection of the optical mouse hence cursor movement ceased, by means of swift lifting/lowering detection of the distance detection device. The present invention can analyze the navigation information and the distance information by the single image, which not only can increase operation efficiency but also can economize hardware cost of the distance detection device with navigation detection function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
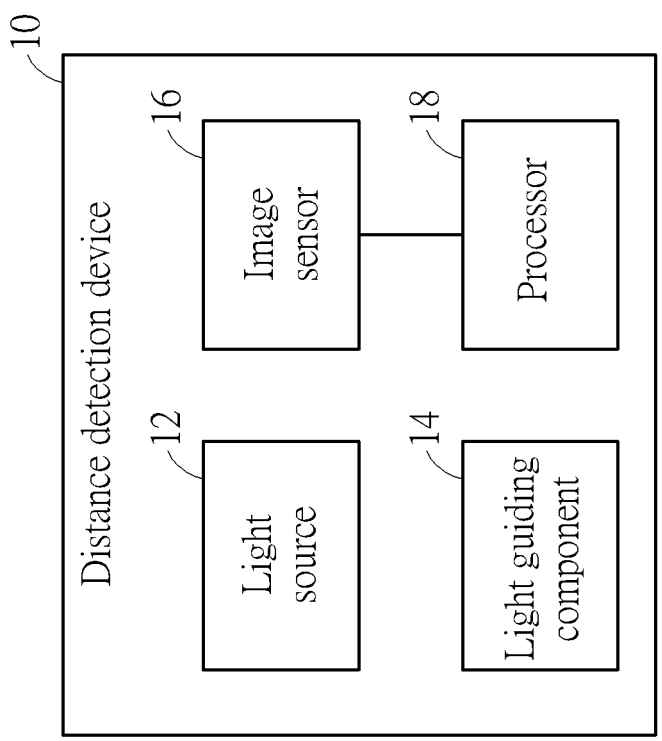
FIG. 1 is a functional block diagram of a distance detection device according to an embodiment of the present invention.

Please refer to FIG. 1. FIG. 1 is a functional block diagram of a distance detection device 10 according to an embodiment of the present invention. The distance detection device 10 includes a light source 12, a light guiding component 14, an image sensor 16 and a processor 18. The light source 12 is utilized to emit a beam, which can be the visible beam or the invisible beam. The light guiding component 14 is disposed adjacent by the light source 12 and adapted to project the beam onto an object to form an illuminating pattern. The image sensor 16 is utilized to capture an image about the object, and the processor 18 electrically connected with the image sensor 16 can analyze features within the image for determining a distance D (which is marked in FIG. 3) from the distance detection device 10 to the object.

Figure 2:
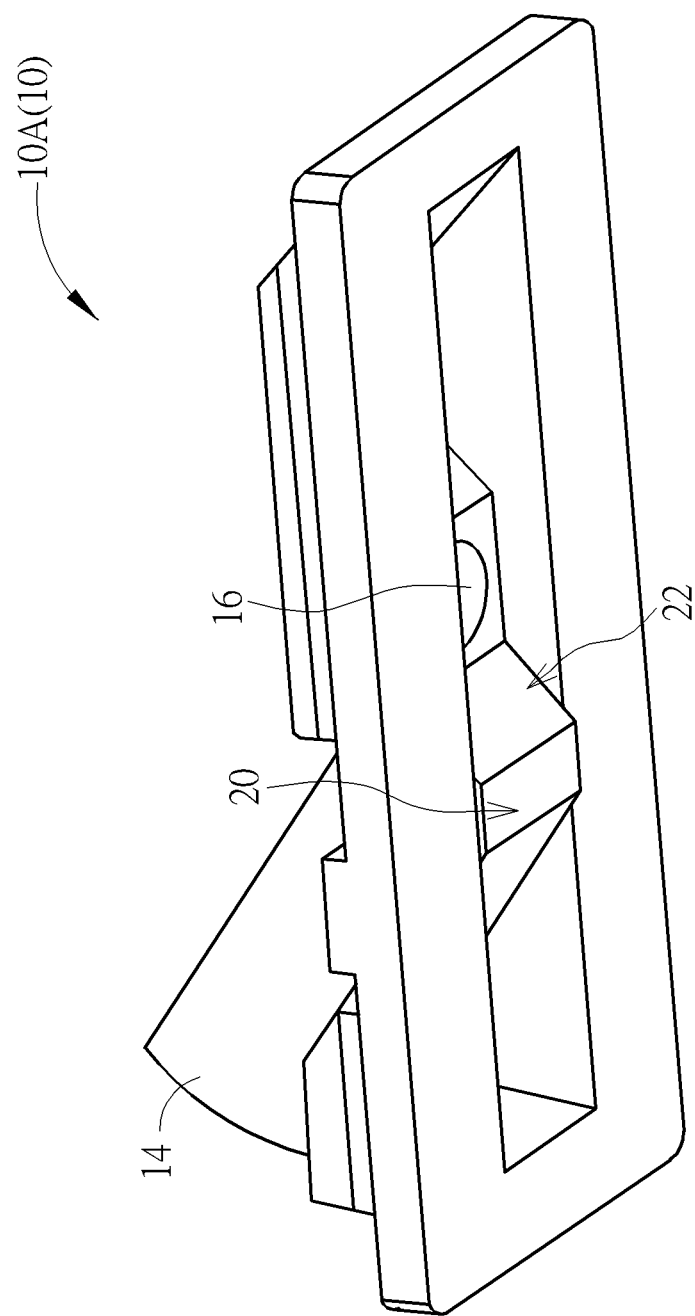
FIG. 2 is a schematic diagram of the distance detection device according to a first embodiment of the present invention.
Figure 3:
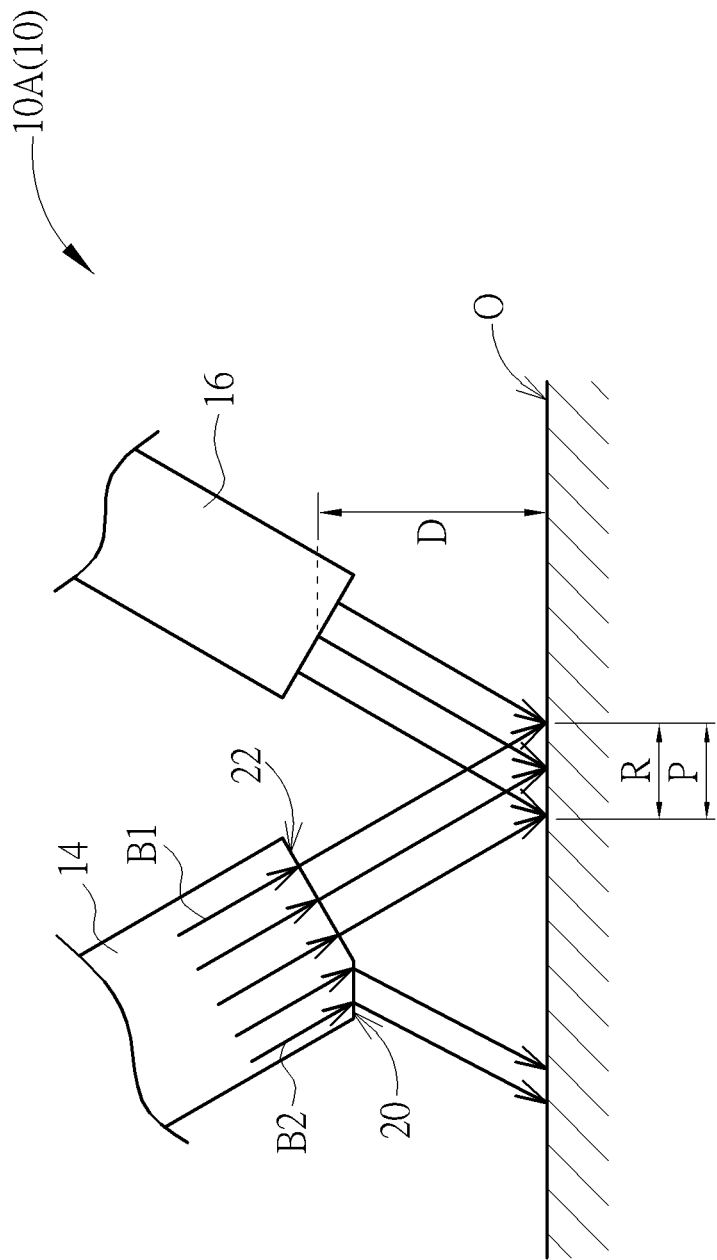
FIG. 3 to FIG. 5 respectively are diagrams of the distance detection device in different operation modes according to the first embodiment of the present invention.
Figure 4:
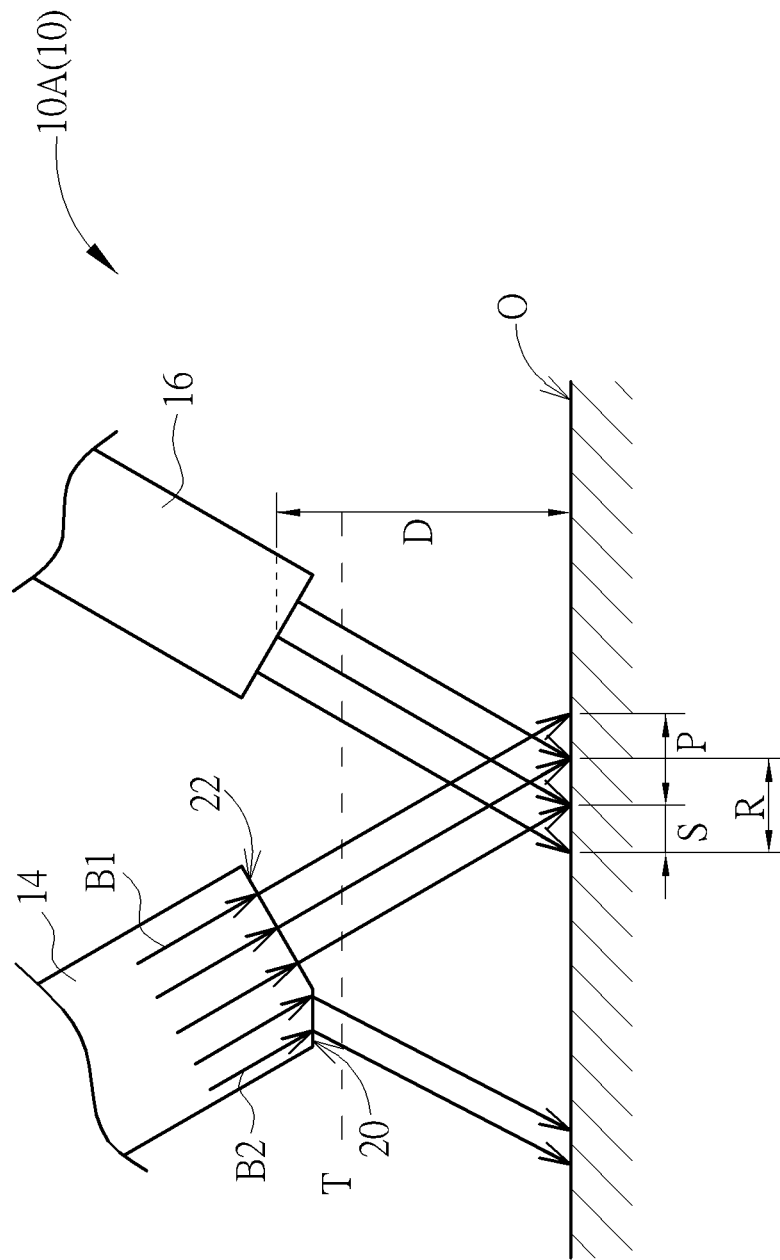
Figure 5:
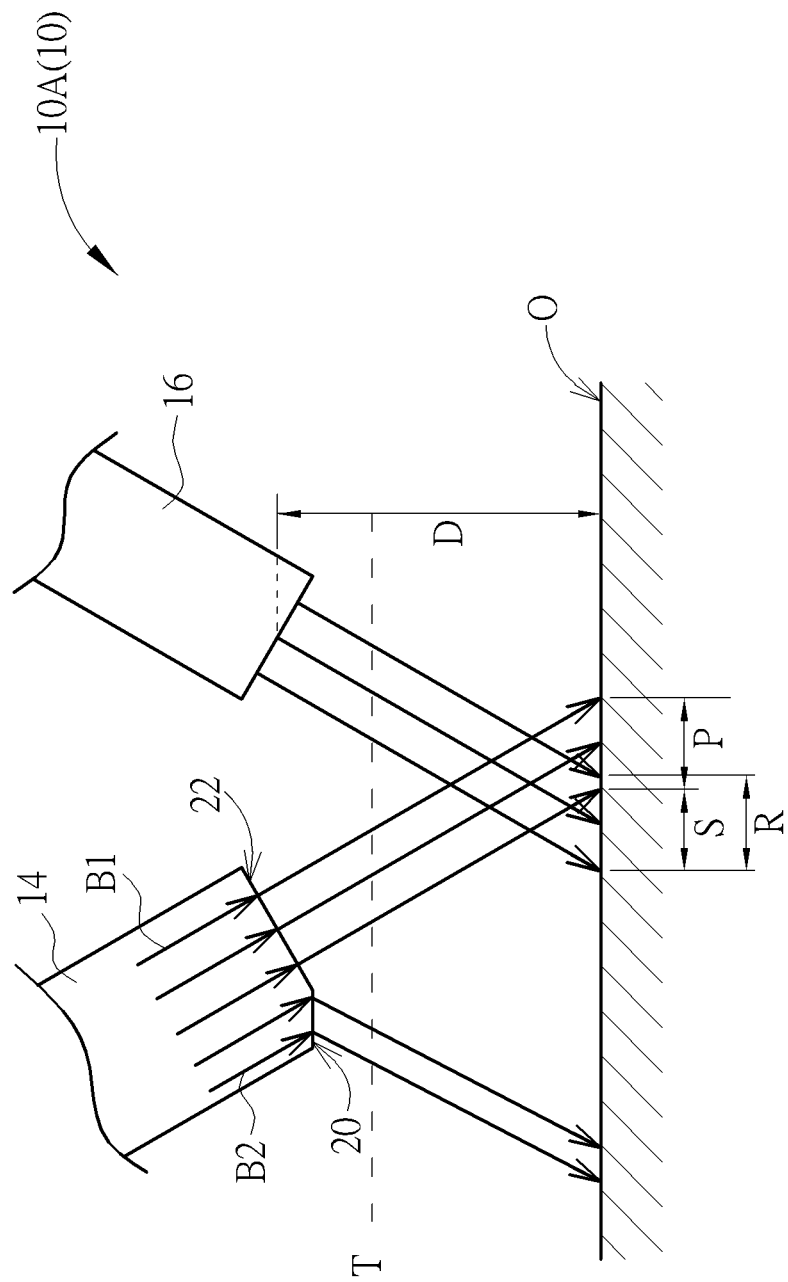
Figure 6:
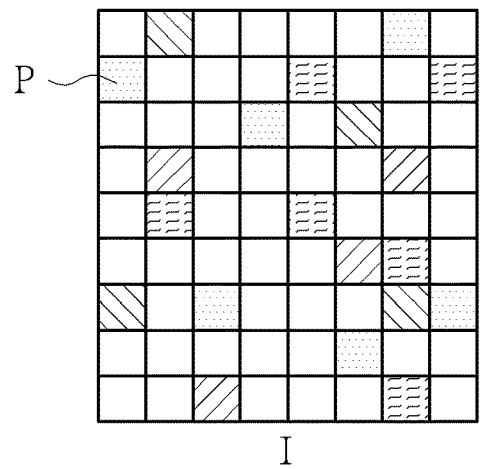
FIG. 6 to FIG. 8 respectively are diagrams of the image captured by the distance detection device in different operation modes shown in FIG. 3 to FIG. 5.
Figure 7:
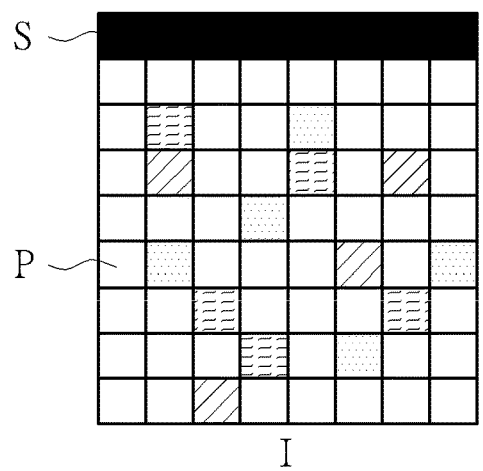
Figure 8:
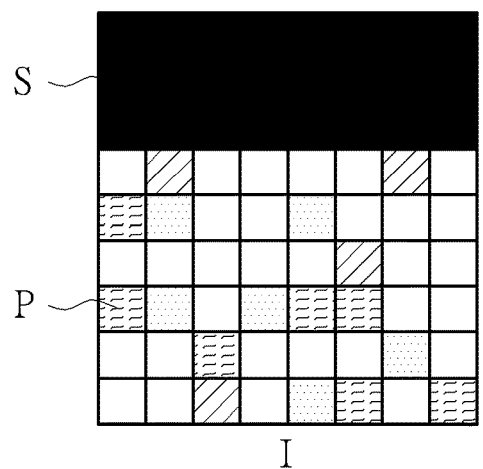

Please refer to FIG. 2 to FIG. 8. FIG. 2 is a schematic diagram of the distance detection device 10A according to a first embodiment of the present invention. FIG. 3 to FIG. 5 respectively are diagrams of the distance detection device 10A in different operation modes according to the first embodiment of the present invention. FIG. 6 to FIG. 8 respectively are diagrams of the image I captured by the distance detection device 10A in different operation modes shown in FIG. 3 to FIG. 5. In the first embodiment, the light guiding component 14 includes a discontinuous surface 20, and the illuminating pattern P can be spotted by the discontinuous surface 20; for example, the discontinuous surface 20 can be a truncated portion formed on a corner or an edge of an illuminating surface 22 of the light guiding component 14. The beam B1 emitted from the light source 12 can pass through the illuminating surface 22 and be projected onto the object O overlapped with a capturing region R of the image sensor 16. The beam B2 emitted from the light source 12 can pass through the discontinuous surface 20 and be projected onto the object O not overlapped with the capturing region R.

The beam B1 is projected onto the object O as the illuminating pattern P, and the beam B2 is projected onto the object O as another pattern far from the illuminating pattern P. A dark region between the foresaid pattern and the illuminating pattern P can be represented as a spot S. Therefore, the processor 18 can analyze position variation of the spot S formed by the discontinuous surface 20 within the image I to determine the distance D. As shown in FIG. 3 and FIG. 6, the distance detection device 10A is suspended above the object O in a specific distance; the illuminating pattern P is within the capturing region R, and the spot S cannot be observed by the image sensor 16. While the distance detection device 10A is lifted to make the distance D varied over a predetermined threshold T, as shown in FIG. 4 and FIG. 7, the illuminating pattern P is shifted to the right and the spot S is moved from an outside into the capturing region R. In case of the distance detection device 10A being lifted, as shown in FIG. 5 and FIG. 8, the illuminating pattern P is shifted to the furthest right, and a size of the spot S within the capturing region R is enlarged. The processor 18 can compute an increased quantity of the distance D in accordance with magnification of the spot S.

The distance detection device 10 designs an obstruction (which means the discontinuous surface 20) on the illuminating surface 22 to change a transmission direction of the beam B2. The spot S is illustrated by dark ink, and the pattern P is illustrated by light ink and twilled. The twilled matter can be used to compute navigation information. The spot S is a shadow resulted from the discontinuous surface 20 (such like the truncated portion), so that the position variation of the spot S happens when the distance detection device 10 is lifted and lowered relative to the object O. The image I about the capturing region R containing the illuminating pattern P and the spot S can be analyzed to acquire horizontal motion (the navigation information) and vertical motion (the lifting or lowering information) of the distance detection device 10 at the same time. The discontinuous surface 20 further can be another feature, and any features capable of forming the spot or fringes inside the capturing region R belong to a scope of the distance detection device 10, which depend on design demand.

Figure 9:
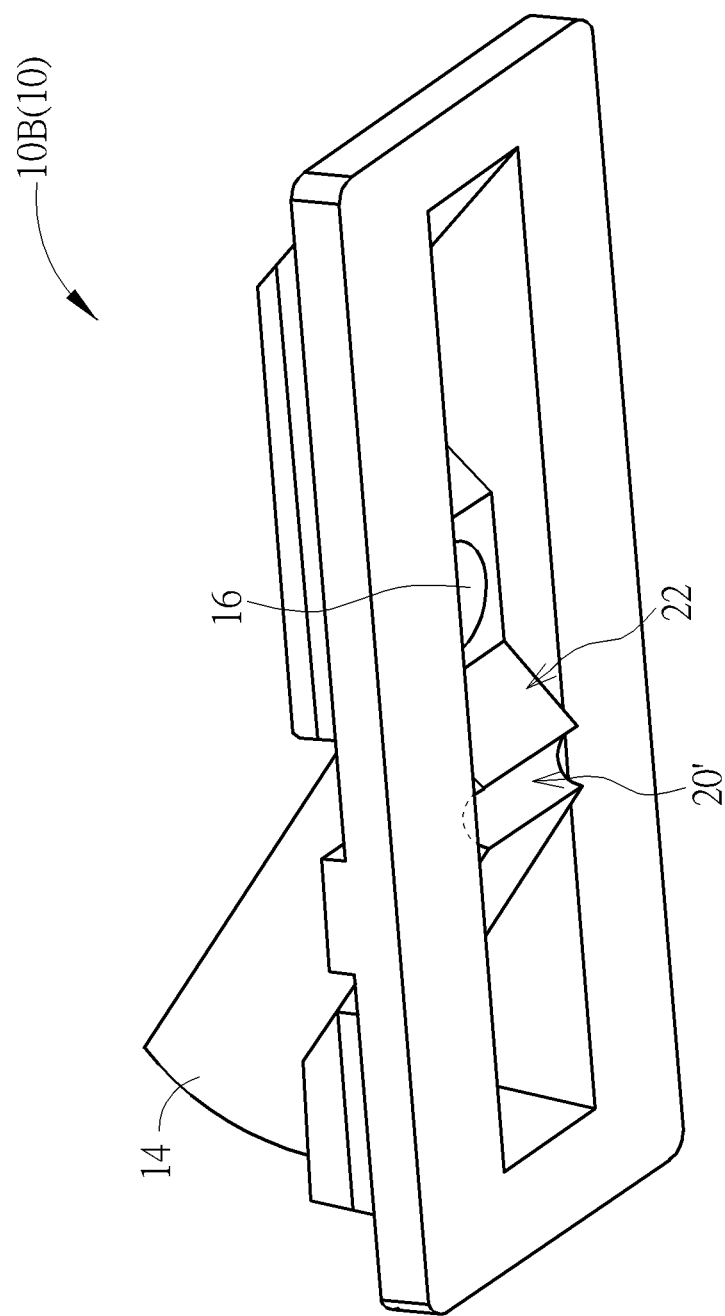
FIG. 9 is a schematic diagram of the distance detection device according to a second embodiment of the present invention.
Figure 10:
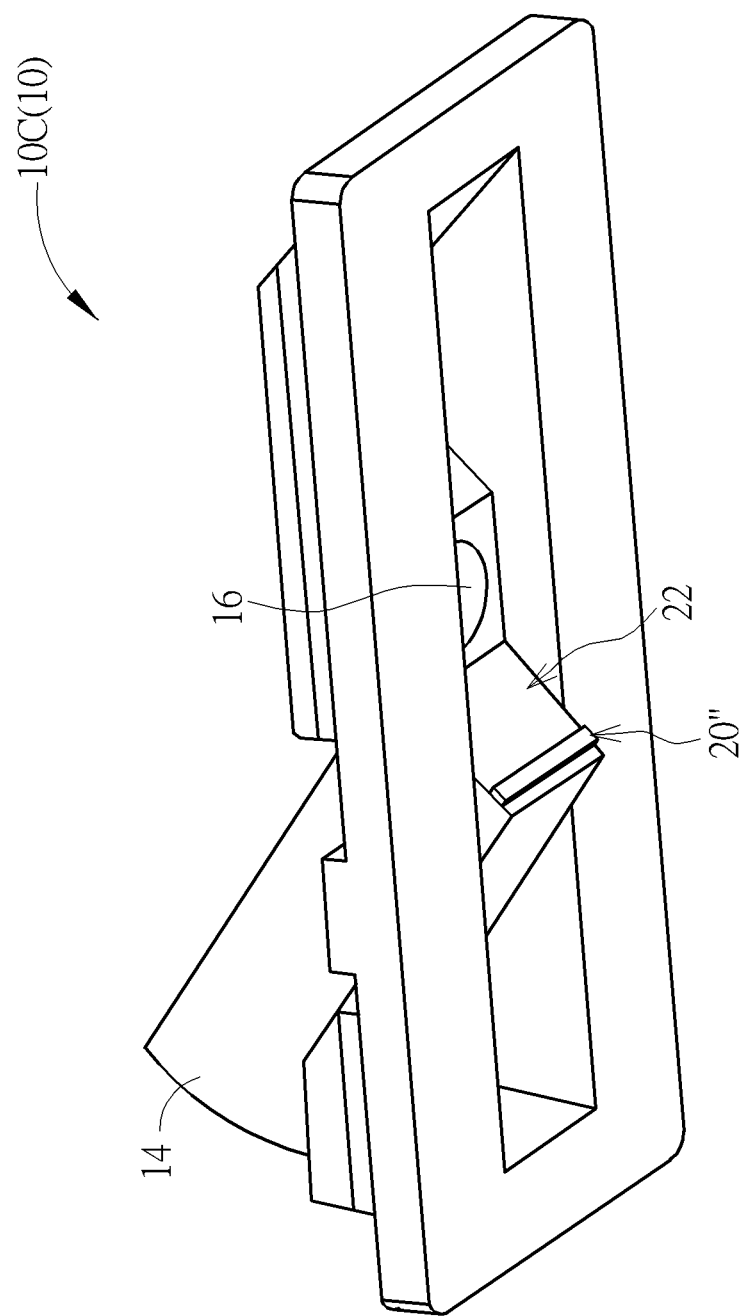
FIG. 10 is a schematic diagram of the distance detection device according to a third embodiment of the present invention.

Please refer to FIG. 9 and FIG. 10. FIG. 9 is a schematic diagram of the distance detection device 10B according to a second embodiment of the present invention. FIG. 10 is a schematic diagram of the distance detection device 10C according to a third embodiment of the present invention. In the follow-up embodiments, elements having the same numeral as one of the above-mentioned embodiment have the same structures and functions, and a detailed description is omitted herein for simplicity. The distance detection device 10B in the second embodiment can include the light guiding component 14 having the discontinuous surface 20' formed as a non-planar structure, and the non-planar structure can be a concave plane or a convex plane. The non-planar structure can be utilized to enlarge a refraction angle between the beam B1 and the beam B2, so that the spot S can be conspicuous for increasing detection accuracy of the distance detection device 10B.

In addition, the distance detection device 10C in the third embodiment can include the light guiding component 14 having the illuminating surface 22 whereon a mask is pasted, and the mask can be represented as the discontinuous surface 20". The discontinuous surface 20" is made of opaque material or transparent material having refractive coefficient different from the illuminating surface 22 to obstruct or to change the transmission path of the beam B2. The spot S is the shadow resulted from the discontinuous surface 20", and the position variation of the spot S happens when the distance detection device 10 is lifted and lowered relative to the object O at the same time. The distance detection device 10C can provide an accurate detection result due to position analysis of the spot S.

Figure 11:
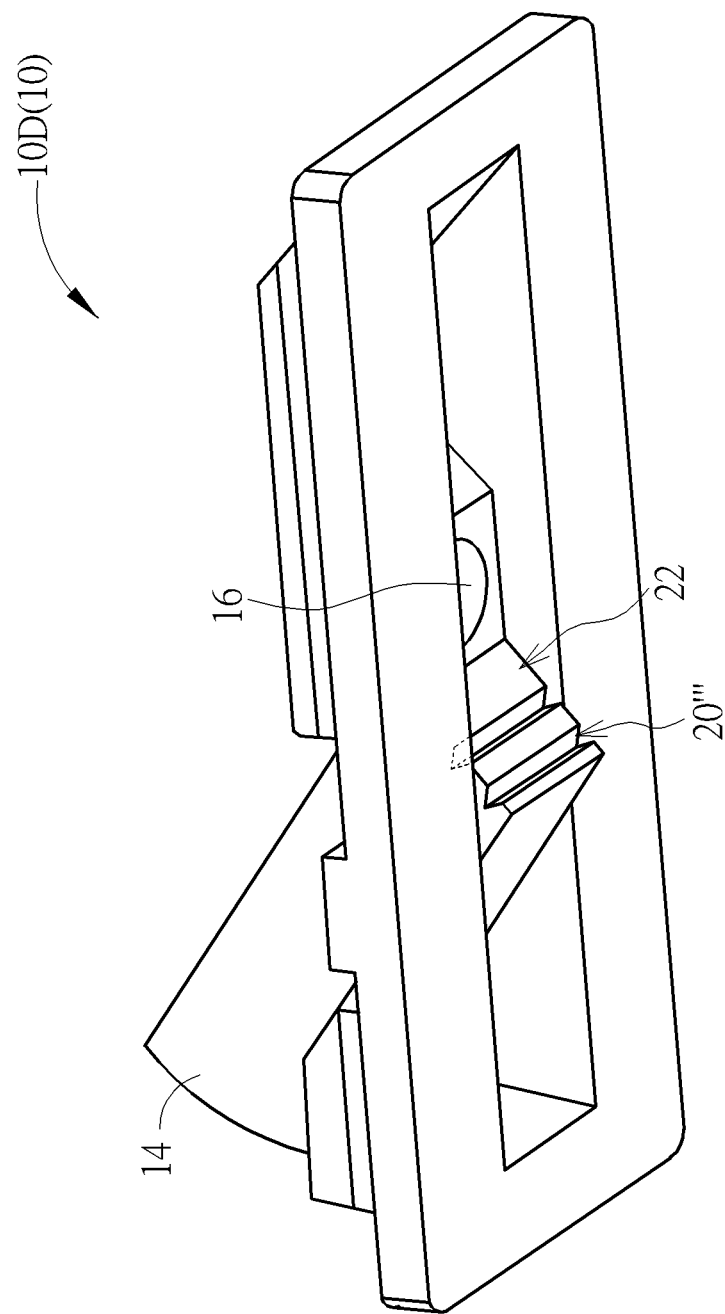
FIG. 11 is a schematic diagram of the distance detection device according to a fourth embodiment of the present invention.
Figure 12:
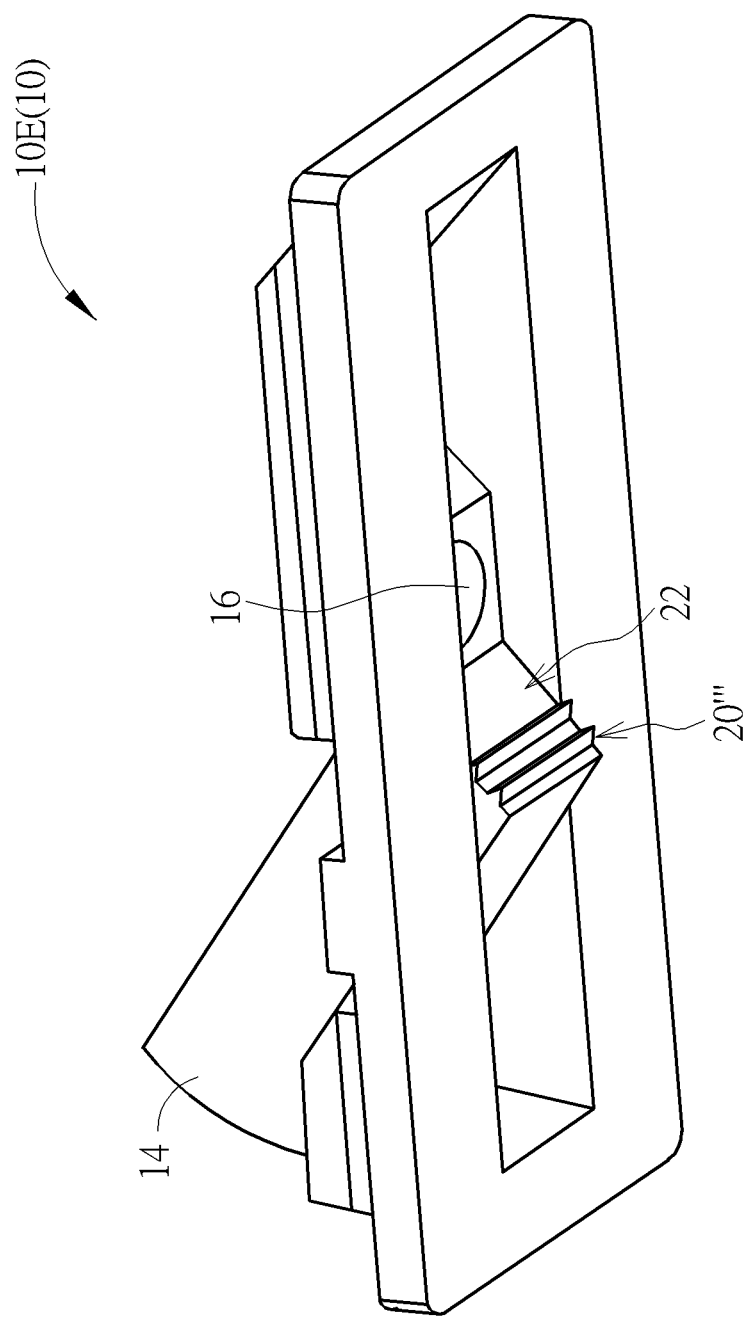
FIG. 12 is a schematic diagram of the distance detection device according to a fifth embodiment of the present invention.

Please refer to FIG. 1, FIG. 11 and FIG. 12. FIG. 11 is a schematic diagram of the distance detection device 10D according to a fourth embodiment of the present invention. FIG. 12 is a schematic diagram of the distance detection device 10E according to a fifth embodiment of the present invention. The discontinuous surface 20' can be an uneven portion, such as a sunken structure shown in FIG. 11 and a protruding structure shown in FIG. 12. The uneven portion has a plurality of slots and protrusions arranged side by side, and the spot S can be viewed as dark fringes. The position variation of the spot S and number variation of the fringes are synchronous with the lifting and the lowering of the distance detection device 10D and the distance detection device 10E. The processor 18 can analyze the spot S resulted from the discontinuous surface 20" to determine the distance D by counting a number of observed fringes, instead of identifying a width of the spot S. The processor 18 may detect motion of the spot S inside the capturing region R or across a boundary of the capturing region R to determine the distance D.

Figure 13:
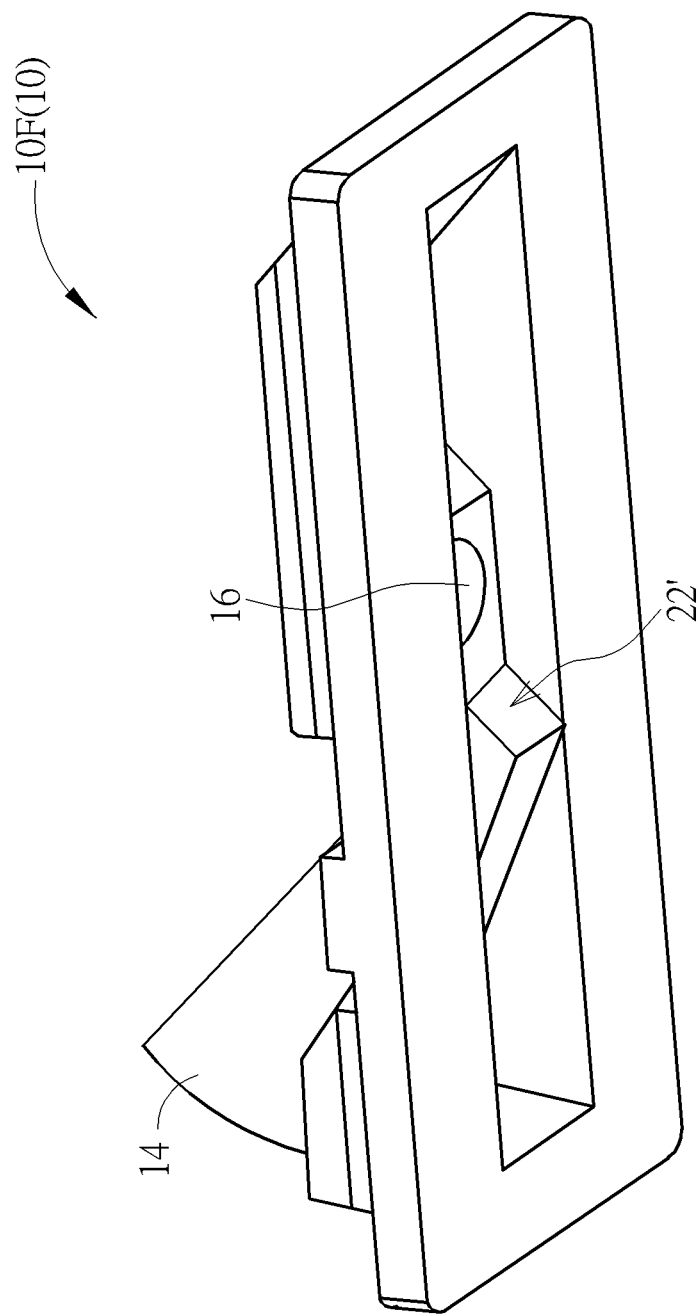
FIG. 13 is a schematic diagram of the distance detection device according to a sixth embodiment of the present invention.
Figure 14:
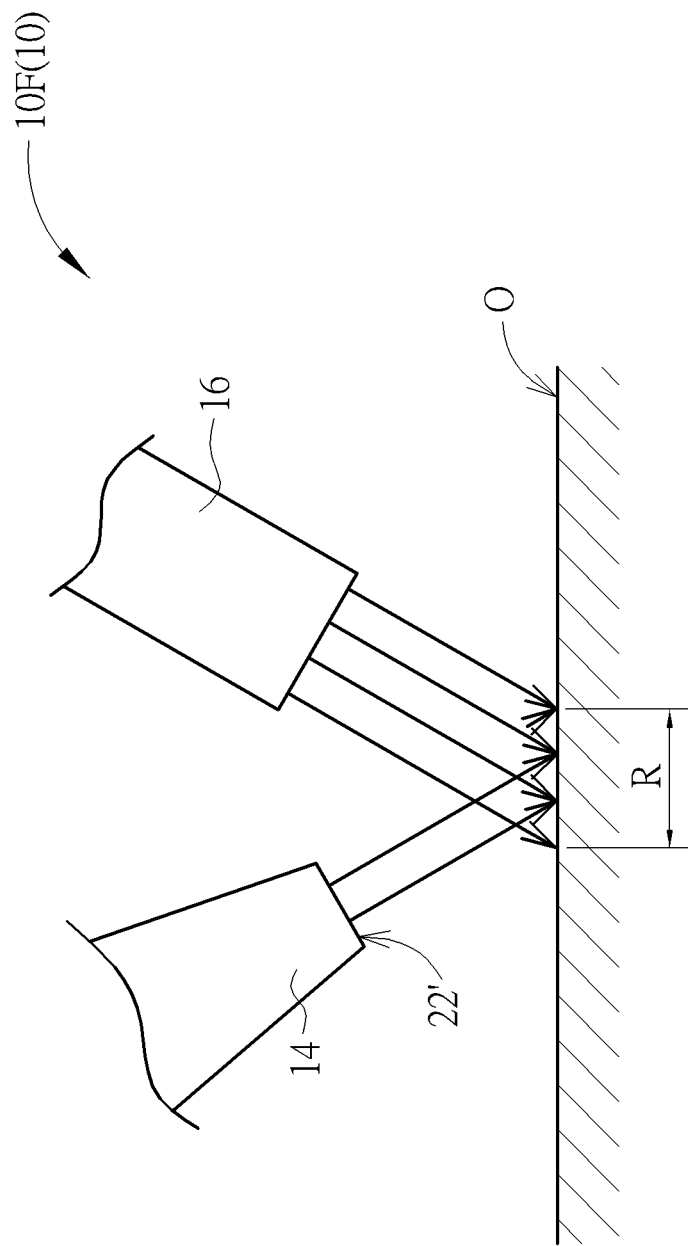
FIG. 14 is another view of the distance detection device shown in FIG. 13.

Please refer to FIG. 1, FIG. 13 and FIG. 14. FIG. 13 is a schematic diagram of the distance detection device 10F according to a sixth embodiment of the present invention. FIG. 14 is another view of the distance detection device 10F shown in FIG. 13. The distance detection device 10F can include the light guiding component 14 having the illuminating surface 22' with small sizes, so that dimensions of the illuminating pattern P formed by the illuminating surface 22' can be smaller than dimensions of the capturing region R, and the processor 18 of the distance detection device 10F can analyze the position variation of the illuminating pattern P within the image I to determine the distance D. It should be mentioned that the illuminating pattern P should be preferably shifted inside the capturing region R while the distance D between the distance detection device 10F and the object O is varied. Further, the illuminating pattern P may be able to shift across the boundary of the capturing region R, which means the processor 18 can analyze whether the illuminating pattern P exists or not to determine variation of the distance D.

Figure 15:
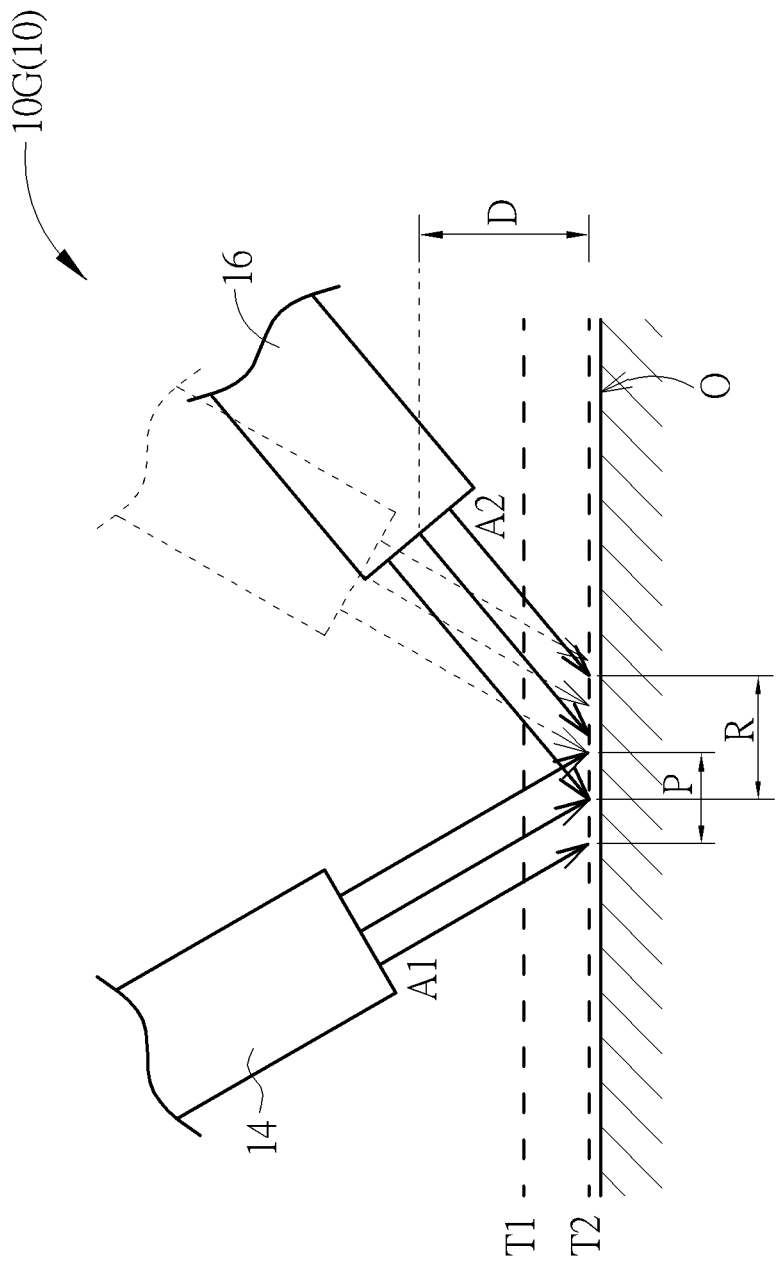
FIG. 15 is a lateral view of the distance detection device according to a seventh embodiment of the present invention.

Please refer to FIG. 1 and FIG. 15. FIG. 15 is a lateral view of the distance detection device 10G according to a seventh embodiment of the present invention. The distance detection device 10G includes the light guiding component 14 which forms the illuminating pattern capable of being partly overlapped with the capturing region R of the image sensor 16 while the distance detection device 10G is lifted or lowered relative to the object O, and an overlapping scale of the illuminating pattern to the capturing region R is varied in accordance with the distance D between the distance detection device 10G and the object O. For example, the distance D is close to a first threshold T1, and the illuminating pattern P is not overlapped with the capturing region R; after then, the distance D is close to a second threshold T2, and the illuminating pattern is partly overlapped with the capturing region R, so the processor 18 can determine the distance detection device 10G is lifted and a lifting height is a value between the first threshold T1 and the second threshold T2.

The light guiding component 14 has a first optical axis A1 slanted to a second optical axis A2 of the image sensor 16. An angle between the first optical axis A1 and the second optical axis A2 is fixed and can be adjusted in different embodiments to set predefined variation of the overlapping scale. As an example of the image sensor 16 illustrated in a dotted line, the dotted image sensor 16 and the light guiding component 14 are symmetric; the distance detection device 10G is lifted from a position having the distance D equal to the first threshold T1, and the illuminating pattern P enters the capturing region R while the distance D is varied to the second threshold T2. As another example of the image sensor 16 illustrated in a solid line, the fixed angle between the first optical axis A1 and the second optical axis A2 is enlarged, which means the solid image sensor 16 and the light guiding component 14 are asymmetric; the distance detection device 10G is lifted from the position having the distance D equal to the first threshold T1, and the illuminating pattern P enters the capturing region R while the distance D is varied to a middle between the first threshold T1 and the second threshold T2. Thus, distance detection sensitivity of the distance detection device 10G can be adjusted in accordance with inclination of the light guiding component 14 and/or the image sensor 16. The distance D set at any point between the first threshold T1 and the second threshold T2 can be determined by interpolation computation or triangulated computation.

Figure 16:
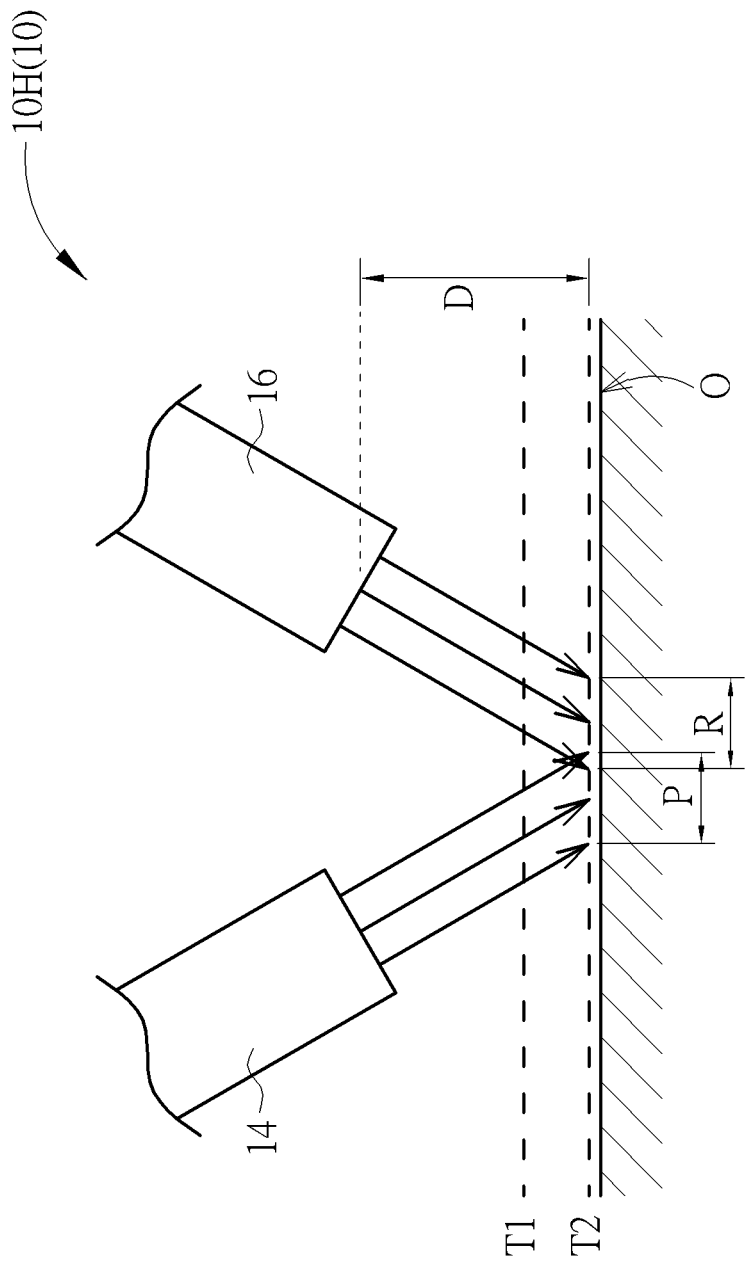
FIG. 16 and FIG. 17 are lateral views of the distance detection device according to different embodiments of the present invention.
Figure 17:
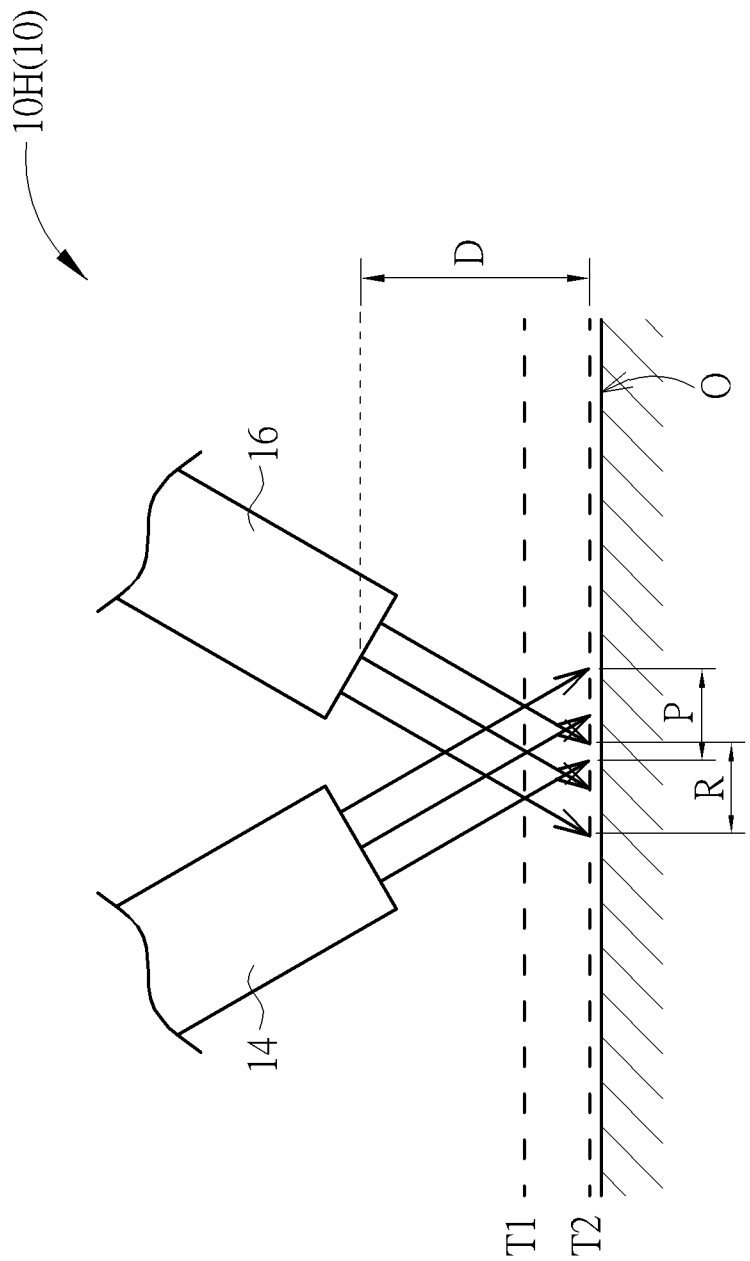

Please refer to FIG. 16 and FIG. 17. FIG. 16 and FIG. 17 are lateral views of the distance detection device 10H according to different embodiments of the present invention. The distance detection device 10H includes the light guiding component 14 which forms the illuminating pattern capable of being partly overlapped with the capturing region R of the image sensor 16 while the distance detection device 10H is lifted or lowered relative to the object O, and the overlapping scale of the illuminating pattern to the capturing region R is varied according to the distance D from the distance detection device 10H to the object O. An interval between the light guiding component 14 and the image sensor 16 can be adjusted to set predefined variation of the overlapping scale for different embodiments.

As shown in FIG. 16, the interval between the light guiding component 14 and the image sensor 16 is wider, and the illuminating pattern P is not overlapped with the capturing region R while the distance D is set in the first threshold T1. The illuminating pattern P within the capturing region R is enlarged while the distance D is varied over the predetermined threshold, which means the illuminating pattern P is gradually overlapped with the capturing region R while the distance D is switched to the second threshold T2. The illuminating pattern P may enter the capturing region R the moment the distance D is increased. As shown in FIG. 17, the interval between the light guiding component 14 and the image sensor 16 is narrow, and the illuminating pattern P is fully overlapped with the capturing region R while the distance D is set in the first threshold T1. The illuminating pattern P within the capturing region R is reduced while the distance D is varied over the predetermined threshold, which means the illuminating pattern P is gradually left the capturing region R while the distance D is switched to the second threshold T2.

In conclusion, the distance detection device of the present invention can detect the image about the object to acquire the navigation information. For the sake of the distance detection function, the spot formed by the discontinuous surface of the light guiding component or the overlapped scale of the illuminating pattern to the capturing region can be applied to establish linear relation between the spot motion and steep motion of the distance detection device. In some embodiments, the planar or non-planar truncated portion can be cut on the corner or the edge of the light guiding component; in another possible embodiments, the sunken structure, the protruding structure or the mask can be disposed close to the edge of the light guiding component; in another possible embodiments, dimensions of the illuminating surface can be reduced or the inclination and interval between the light guiding component and the image sensor can be adjusted for obtaining variation of the overlapped scale.

The distance detection device can be applied for a navigation apparatus, such as an optical mouse. The navigation apparatus can stop displacement detection of the optical mouse hence cursor movement ceased, by means of swift lifting/lowering detection of the distance detection device. Comparing to the prior art, the present invention can analyze the navigation information and the distance information by the single image, which not only can increase operation efficiency but also can economize hardware cost of the distance detection device with navigation detection function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A distance detection device, comprising:
   a light source;
   a light guiding component disposed adjacent to the light source and comprising a discontinuous surface, the discontinuous surface being formed on an outer surface of the light guiding component, the light guiding component being adapted to project a beam emitted from the light source onto an object to form an illuminating pattern spotted by the discontinuous surface;
   an image sensor adapted to capture an image about the object; and
   a processor electrically connected with the image sensor and utilized to analyze position variation of a spot formed by the discontinuous surface within the image for determining a distance of the object.

2. The distance detection device of claim 1, wherein the discontinuous surface is a truncated portion formed on a corner or an edge of an illuminating surface of the light guiding component.

3. The distance detection device of claim 2, wherein the image sensor has a capturing region, the spot is moved from an outside of the capturing region into the capturing region while a distance between the distance detection device and the object is varied over a predetermined threshold.

4. The distance detection device of claim 1, wherein the discontinuous surface is an uneven portion formed on an illuminating surface of the light guiding component.

5. The distance detection device of claim 4, wherein the spot is moved within a capturing region of the image sensor while a distance between the distance detection device and the object is varied.

6. The distance detection device of claim 4, wherein the uneven portion is a sunken structure or a protruding structure disposed on the illuminating surface.

7. The distance detection device of claim 1, wherein the discontinuous surface is a mask pasted on an illuminating surface of the light guiding component.

8. The distance detection device of claim 1, wherein the discontinuous surface is a non-planar structure formed on the light guiding component.

9. A distance detection device, comprising:
   a light source;
   a light guiding component disposed adjacent to the light source and comprising an illuminating surface, a beam emitted from the light source passing through the illuminating surface and being projected onto an object to form an illuminating pattern;
   an image sensor having a capturing region and adapted to capture an image about the object, the capturing region being an area about the object where the image sensor senses, dimensions of the illuminating pattern being smaller than dimensions of the capturing region; and
   a processor electrically connected with the image sensor and utilized to analyze position variation of the illuminating pattern within the image for determining a distance of the object.

10. The distance detection device of claim 9, wherein the illuminating pattern is shifted inside the capturing region while a distance between the distance detection device and the object is varied.

11. The distance detection device of claim 9, wherein the illuminating pattern is shifted from an outside of the capturing region into the capturing region while a distance between the distance detection device and the object is varied.

12. A distance detection device, comprising:
   a light source;
   a light guiding component disposed adjacent to the light source and comprising an illuminating surface, a beam emitted from the light source passing through the illuminating surface and being projected onto an object to form an illuminating pattern;
   an image sensor having a capturing region and adapted to capture an image about the object, an overlapping scale of the illuminating pattern to the capturing region being varied according to a distance of the object; and a processor electrically connected with the image sensor and utilized to analyze the overlapping scale for determining the distance of the object;

wherein the distance of the object is switched between a first threshold and a second threshold to adjust the overlapping scale.

13. The distance detection device of claim 12, wherein a first optical axis of the light guiding component is slanted to a second optical axis of the image sensor, and a fixed angle formed between the first optical axis and the second optical axis is adjusted to set predefined variation of the overlapping scale.

14. The distance detection device of claim 12, wherein an interval between the light guiding component and the image sensor is adjusted to set predefined variation of the overlapping scale.

15. The distance detection device of claim 12, wherein the first threshold is shorter than the second threshold, the illuminating pattern and the capturing region are not overlapped while the distance is set in the first threshold, and the illuminating pattern and the capturing region are overlapped while the distance is switched from the first threshold to the second threshold.

16. The distance detection device of claim 15, wherein the illuminating pattern within the capturing region is enlarged while the distance is varied over a predetermined threshold.

17. The distance detection device of claim 12, wherein the first threshold is longer than the second threshold, the illuminating pattern is fully overlapped with the capturing region while the distance is set in the first threshold, and the illuminating pattern is partly overlapped with the capturing region while the distance is switched from the first threshold to the second threshold.

18. The distance detection device of claim 17, wherein the illuminating pattern within the capturing region is reduced while the distance is varied over a predetermined threshold.

* * * * *